(12) United States Patent
Gangadharan (10) Patent No.: US 8,903,181 B2
(45) Date of Patent: Dec. 2, 2014

(54) LOW COST UNIQUE IDENTIFICATION GENERATION USING COMBINATION OF PATTERNS AND UNIQUE CODE IMAGES

(76) Inventor: Venkatesh Gangadharan, Bangalore (IN)

( * ) Notice: Subject to any disclaimer, the term of this patent is extended or adjusted under 35 U.S.C. 154(b) by 30 days.

(21) Appl. No.: 13/448,397

(22) Filed: Apr. 17, 2012

(65) Prior Publication Data

US 2013/0170758 A1 Jul. 4, 2013

(51) Int. Cl.
*G06K 9/68* (2006.01)
(52) U.S. Cl.
USPC .......................................................... 382/218
(58) Field of Classification Search
None
See application file for complete search history.

(56) References Cited

U.S. PATENT DOCUMENTS

| 2006/0161788 | A1* | 7/2006 | Turpin et al. ................... | 713/186 |
| 2010/0029380 | A1* | 2/2010 | Rhoads et al. .................. | 463/29 |
| 2010/0260426 | A1* | 10/2010 | Huang et al. ................... | 382/218 |

FOREIGN PATENT DOCUMENTS

| WO | WO 2009/115611 A2 * | 9/2009 |
| WO | WO 2011/077459 A2 * | 6/2011 |

* cited by examiner

*Primary Examiner* — Barry Drennan
*Assistant Examiner* — Siamak Harandi (57) ABSTRACT

The embodiments disclosed herein relates to a method and system for authentication of an object by forming a unique ID for the object. An authentication server identifies a unique natural pattern associated with the object to be verified. For the identified pattern, the authentication server assigns a unique ID. The pattern and unique ID are then stored in a database. The unique ID is then pasted on the object. For authentication, an image of the object with unique ID is captured and is sent to the authentication server for authentication. The authentication server first extracts from the received second image the unique ID, which is then used to retrieve from the database the stored pattern corresponding to it. The pattern in the received second image is then compared with the original pattern retrieved from the database. Based on the comparison, the system confirms authenticity of the object.

8 Claims, 6 Drawing Sheets

LOW COST UNIQUE IDENTIFICATION GENERATION USING COMBINATION OF PATTERNS AND UNIQUE CODE IMAGES

This application claims priority from Indian application 4637/CHE/2011 titled "Low cost unique identification generation using combination of patterns and unique code images" and filed on Dec. 28, 2011.

TECHNICAL FIELD

The embodiments herein relate to communication and, more particularly, to a system and method for authentication of objects.

BACKGROUND

Authentication methods play an important role in distinguishing genuine objects from counterfeit objects. Objects such as documents, textile items, woodcrafts, automotive parts, consumer products and so on are subject to forgery through replication/duplication. In most of the cases, it is difficult to check whether an object is authentic or not, by means of manual inspection. Counterfeit objects compromise quality and hence, the customer who purchases a counterfeit object is not obtaining the value for her investment. Forging also raises security related issues.

An existing system to prevent forgery of objects such as documents uses digital watermarks to authenticate objects. When a digital watermark is used for authentication purposes, it is made invisible such that it can be read only if the location of the digital watermark is known. Also, the nature of the information embedded should be known. But with the latest forgery techniques, it is possible to effectively duplicate the digital watermark, making the system ineffective.

In another existing technique for preventing forgery, bar codes are associated with the objects for the purpose of authentication. A bar code is an optical machine readable representation of data. The data present in a bar code shows details about the object to which the bar code is attached. Special optical scanners called bar code readers are required to scan bar codes. The problem with the technique of using only bar codes is that the bar codes can be easily reproduced and/or copied which makes the system vulnerable for counterfeiting. Further, the special bar code readers are expensive and require an additional computing device to decode the information.

Another existing system for preventing forgery and duplication of objects uses a combination of nanoparticle spray and bar code. The problem with this method is that a dedicated magnetic reader is required for reading the nanoparticle pattern and an optical reader is required for bar code reading. The use of two readers adds to the overall cost of the system.

In another existing method for preventing object counterfeiting, biometric measurement techniques such as fingerprint and/or iris scanning are used. Biometric scanners are expensive devices and use of such scanners adds to the cost of the system.

Another existing technique used for object authentication uses near field communication (NFC) technique. NFC technique allows simplified transactions and data exchange between two devices in close proximity to each other. Special NFC chips are to be embedded in objects so as to enable communication between them and a reading device. Object identification codes could be stored and read from the NFC chips. The requirement of dedicated NFC chips makes the system expensive.

Another existing technique for prevention of object counterfeiting uses RFID based techniques. An RFID system uses radio waves for the purpose of identification and tracking of object. An RFID tag is formed and is attached to the object to be tracked. A RFID reader could read object identification codes from the tags. RFID tags and readers are expensive and add to the total cost of the system.

Another existing system for authentication is called Laser Surface Authentication (LSA) where the system reads the surface of the object and obtains a unique digital serial code. An issue with this system is that the laser based identification scheme requires dedicated system components which add to the cost of the system.

Another existing system for authentication uses a technology called Physical Unclonable Function (PUF). PUF implements a challenge-response kind of authentication. This technology is more suited for silicon chips. An issue associated with the PUF technology is that it lacks stability, with changes in environmental parameters such temperature, pressure and humidity. The physical properties on which this technology depends also change with aging.

SUMMARY

In view of the foregoing, an embodiment herein discloses a method for authenticating an object, wherein a unique pattern is naturally present on the surface of the object, the method comprising of capturing an image of the surface of the object, extracting salient features from the image, extracting a unique ID from the salient features; enrolling the salient features and the ID in a database at the time of production; affixing the unique ID on the object and shipping the object to a consumer; obtaining an image of the surface of the object and the ID at the time of verification; computing the salient features from the image; using the unique ID for retrieving the salient features corresponding to the unique ID from a database; comparing the salient features of the received image with the salient features of the retrieved image; flagging the object as an authentic object, if the features match; and flagging the object as a counterfeit, if the features do not match.

Also, disclosed herein is a system for authenticating an object, wherein a unique pattern is naturally present on the surface of the object, the system comprising of at least one means configured for capturing an image of the surface of the object, extracting salient features from the image, extracting a unique ID from the salient features; enrolling the salient features and the ID in a database at the time of production; affixing the unique ID on the object and shipping the object to a consumer; obtaining an image of the surface of the object and the ID at the time of verification; computing the salient features from the image; using the unique ID for retrieving the salient features corresponding to the unique ID from a database; comparing the salient features of the received image with the salient features of the retrieved image; flagging the object as an authentic object, if the features match; and flagging the object as a counterfeit, if the features do not match Further, disclosed herein is a device for authenticating an object, wherein a unique pattern is naturally present on the surface of the object, the device comprising of at least one means configured for capturing an image of the surface of the object, extracting salient features from the image, extracting a unique ID from the salient features; enrolling the salient features and the ID in a database at the time of production; affixing the unique ID on the object and shipping the object to a consumer; obtaining an image of the surface of the object and the ID at the time of verification; computing the salient features from the image; using the unique ID for retrieving the salient features corresponding to the unique ID from a database; comparing the salient features of the received image with the salient features of the retrieved image; flagging the object as an authentic object, if the features match; and flagging the object as a counterfeit, if the features do not match These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The various features of the application and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description used herein is intended merely to facilitate an understanding of ways in which the embodiments herein may be practiced and to further enable those of skill in the art to practice similar embodiments. Accordingly, the description should not be construed as limiting the scope of the embodiments herein.

The embodiments herein disclose a system and method for authentication of objects using a combination of images of surface patterns and unique IDs. Referring now to the drawings, and more particularly to FIGS. 1 through 5, where similar reference numbers denote corresponding features consistently throughout the figures, there are shown embodiments.

Figure 1:
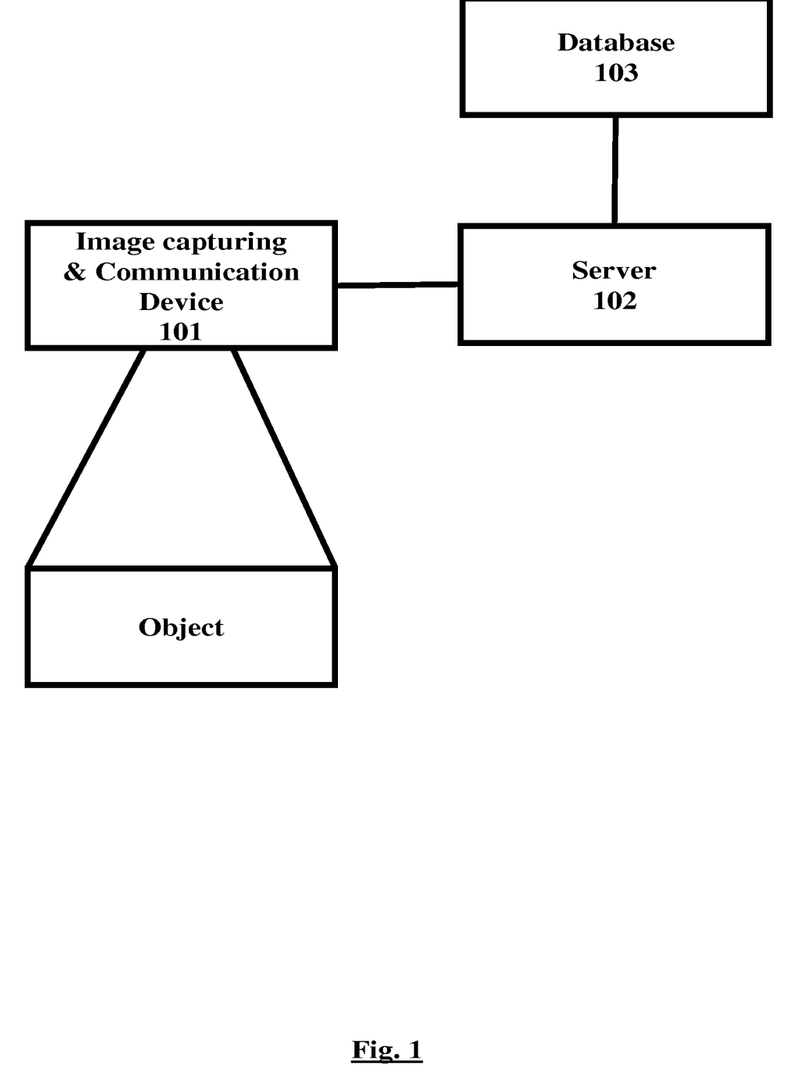
FIG. 1 illustrates a general block diagram of an authentication system as disclosed in the embodiments herein.

FIG. 1 illustrates a general block diagram of an authentication system as disclosed in the embodiments herein. In an embodiment, the object can be a document, woodcraft, textile or any such object which has a natural pattern present on it, wherein the natural pattern may be formed either through natural formation or a result of the manufacturing process. For instance, the document may be printed on a suitable paper such as a handmade paper, deckle-edged paper, recycled paper or any other paper like surface suitable for printing and has unique patterns present on its surface. The woodcraft may have a unique pattern on its surface, which may be due to the natural grain of the wood/laminate/coating used. The textile may have a unique pattern, which may arise due to the fact that the textile may be hand woven/stitched. The system comprises an image capturing and communication device 101, a server 102, database 103 and an object 104. The image capturing and communication device 101 could be a mobile phone with a camera or any such device that is capable of capturing an image of an object and allows transmitting the image to a destination through a wireless/wireline connectivity device or modem. In an embodiment, image capturing and communicating device 101 is capable of processing the natural pattern of a specific portion of the captured image to derive the salient features of the pattern. In an embodiment, the server 102 can perform at least two tasks—de-duplication and authentication. The server may also have an access to a database 103. In an embodiment the server 102 may have an additional server, which has access to the database 103. In an embodiment, the server 102 is capable of processing the natural pattern of a specific portion of the captured image and derives its salient features. The uniqueness of the salient features is tested with the previously registered entries in the database 103. This process is known as de-duplication. Further, the server 102 stores the unique salient features of the received image of the object and corresponding unique ID in the database 103 associated with the authentication system. If the salient features of the captured image are not unique, the server repeatedly requests for images of different portions of the object, till uniqueness is achieved. The server 102 computes a unique ID from the unique salient features of the captured image. The unique ID is transmitted back to the image capturing device 101. The unique ID is then affixed to the object.

Figure 2:
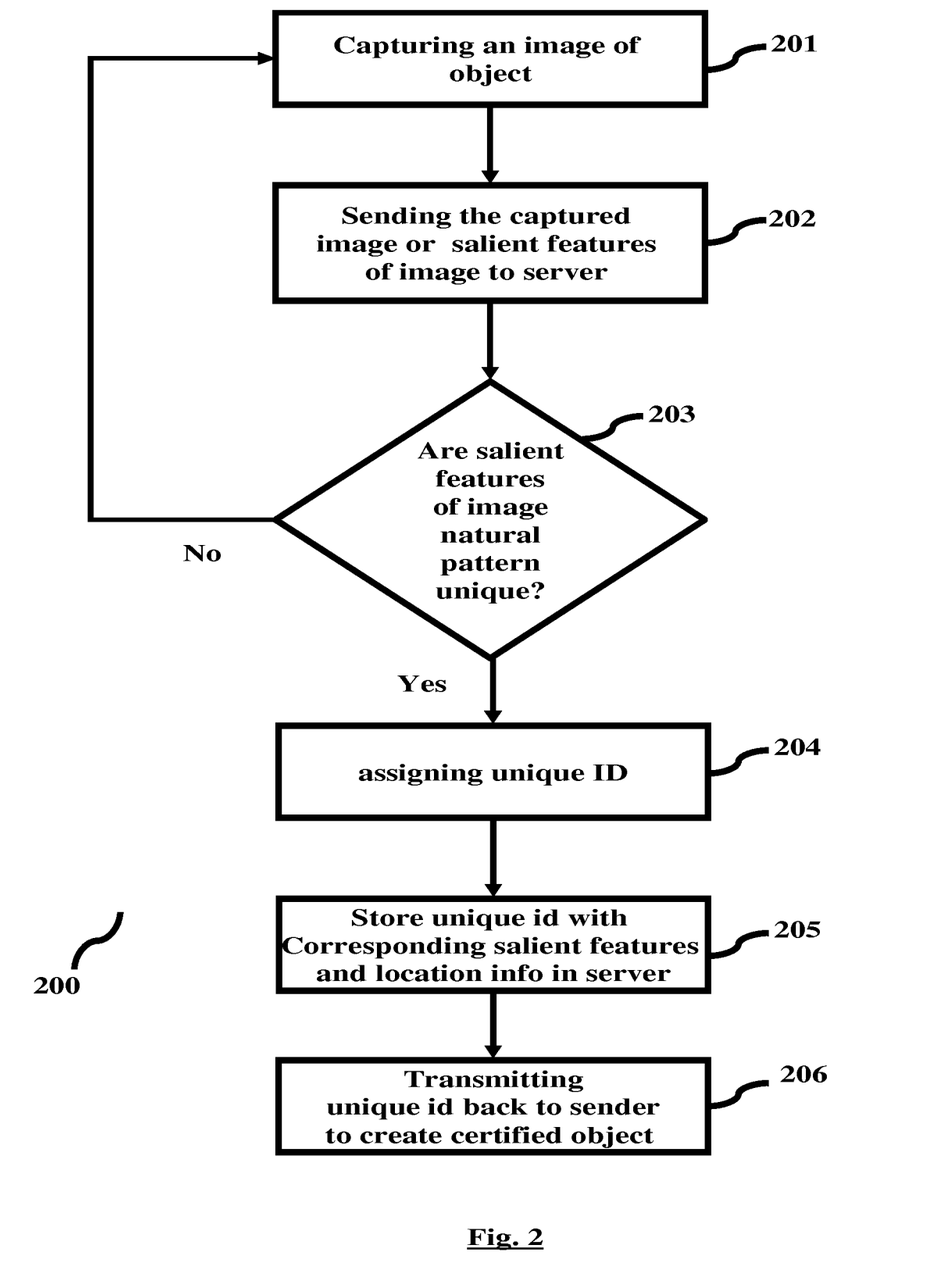
FIG. 2 illustrates a flow diagram which describes the process of locating an area of the object that has unique salient features and assigning a unique ID to the salient features, as disclosed in the embodiments herein.

FIG. 2 illustrates a flow diagram which describes the process of locating an area of the object that has unique salient features and assigning a unique ID to the salient features as disclosed in the embodiments herein. A first image also referred to as the "original image" of the object to be authenticated is captured (201) using the image capturing and communication device 101. The image, which is being captured, should contain a natural pattern within an identified region L on the object. Further, the captured original image is sent (202) to the authentication server 102. In one embodiment, the captured image may be sent to the server 102 through wireline and/or wireless channel. Further, the server extracts the salient features of the natural pattern in the specific identified region L of the received image. In another embodiment, the specific identified region L of the captured original image may be first processed within the image capturing and communication device to extract salient features of the natural pattern, and these features are then sent (202) to the authentication server through a wireline/wireless channel. In one embodiment, the system may use processing such as "line detection" or any such suitable algorithm for extracting salient features of the corresponding portion of the original image of the object. Further, the system checks (203) if salient features of the original image natural pattern are unique to that particular object (de-duplication). In one embodiment, the system may check uniqueness of salient features of original image natural pattern by making a comparison with the salient features of the already stored images in the database. If the salient features are not unique, the server 102 examines a different identified region L of the received image, if available, or re-requests the image capturing device 101 to process a different identified region L of the object. This process is repeated till an image pattern producing unique salient features is found. The server 102 then generates and assigns (204) a unique ID for the pattern which is represented through a code. In an embodiment, the code may be a bar code, a matrix code, a Quick Response (QR) code or any code which may be used to uniquely identify the salient features of the identified region L of the object. In another embodiment, certain number of bits in each code may represent various attributes of the object. In another embodiment, the various attributes of an object may comprise object type, type of material, type of formation, type of processing and even the number of objects and/or any such factors.

Further, the object image, the salient features, the location of the portion from where the salient features were drawn to compute the corresponding unique ID is stored (205) in a database 103 associated with the authentication server 102. Further, the authentication server 102 transmits (206) the unique ID or its code representation back to the sender through a wireline and/or wireless channel. The code corresponding to the unique ID is affixed (207) on the object to create a "certified object". The affixing may be created by printing the code on the object or by printing it on a paper strip which is then pasted or fastened onto the object. The portion where the code is overlaid should not be the same as the identified region L captured in the first image. In another embodiment, an area may be demarcated by a suitable indicating means such as lines, a quadrilateral or any other suitable shape, wherein the demarcation can be used either as identified region L to determine the area from where the unique ID is to be recovered or used as the reference with respect to which the location of the natural pattern is determined. The various actions in method 200 may be performed in the order presented, in a different order or simultaneously. Further, in some embodiments, some actions listed in FIG. 2 may be omitted.

Figure 3:
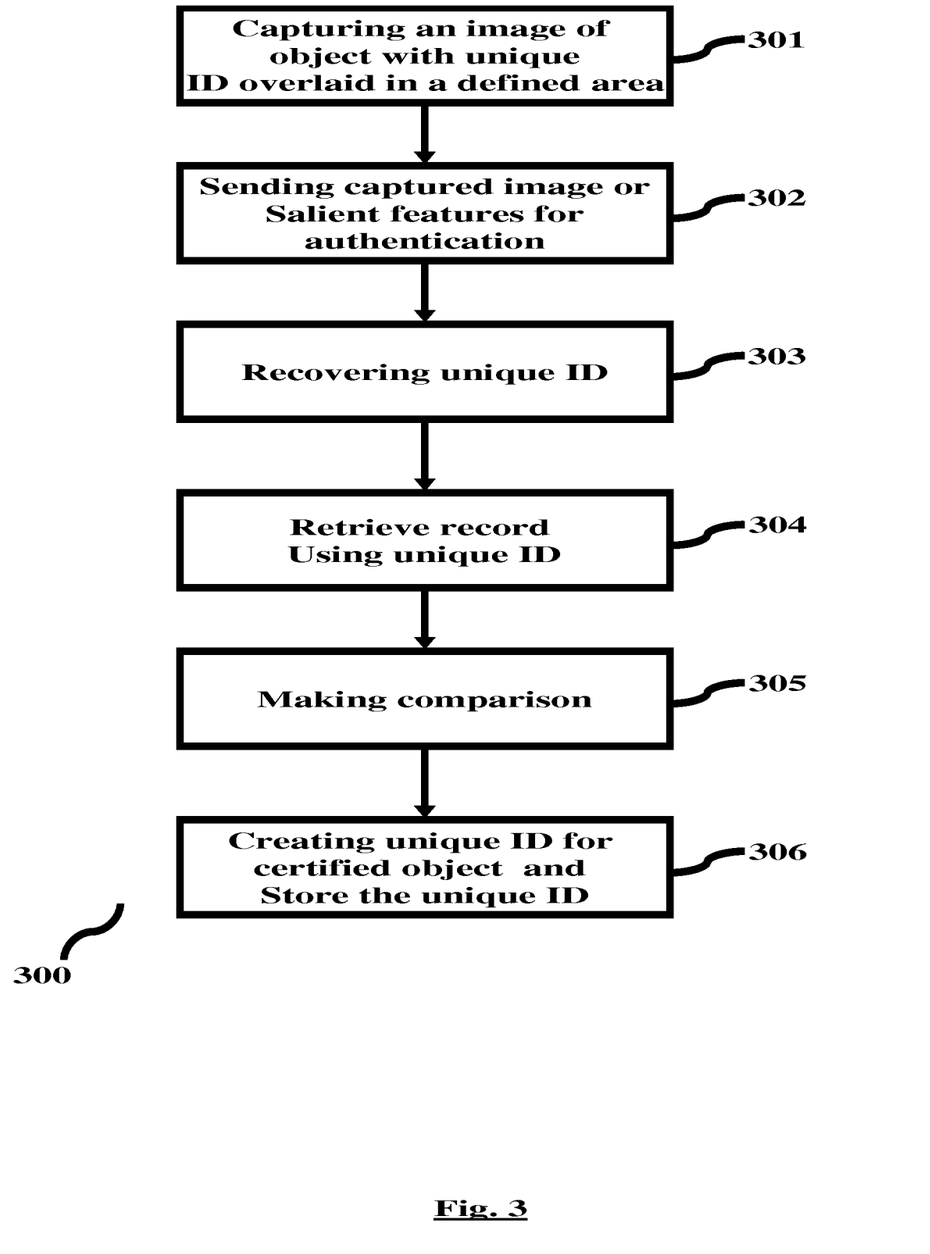
FIG. 3 illustrates a flow diagram which describes the process of trial authentication of an object at the producer end, as disclosed in the embodiments herein.

FIG. 3 illustrates a flow diagram which describes the process of trial authentication of an object at the producer end as disclosed in the embodiments herein. In this process the certified object is verified on a trial basis before shipping to a consumer. A second image also referred to as "the verification image" of the object within the specified region L is captured (301) using an image capturing and communication device. The unique ID affixed to the object is also captured. Further, the verification image and the unique ID of the object are sent (302) to the server 102. In an embodiment, the image capturing device could process the image to derive the salient features which could be sent to the server 102. Further, from the received verification image, the server computes (303) the salient features of the image, if necessary. Further, the server 102 retrieves (304) the original image data record from the database 103 using the unique ID. This record has the salient features of the original image and the location L of the original image from which these features were drawn. Further, authentication of the object is performed by comparing (305) the salient features extracted from the verification image with the salient features of the original image retrieved from the database. In another embodiment, the image capturing device may recover the unique ID first. The unique ID is then sent to the server 102 which retrieves the relevant data record from the database. Location information of specified region L is transmitted from the data record in a secured way to the image capturing device in order to prevent unauthorized access of the location information. The image capture device then captures the image of the specified region L. This image is transmitted to the server. The server extracts the salient features of the natural pattern of the verified image. The server compares these with the salient features of the original image retrieved from the database to perform the authentication. If the salient features of the original image and the verification image match, then authentication is deemed succeeded, else authentication is deemed failed. The authentication result is transmitted (306) to the producer end to conclude the trial authentication. The various actions in method 300 may be performed in the order presented, in a different order or simultaneously. Further, in some embodiments, some actions listed in FIG. 3 may be omitted.

Figure 4:
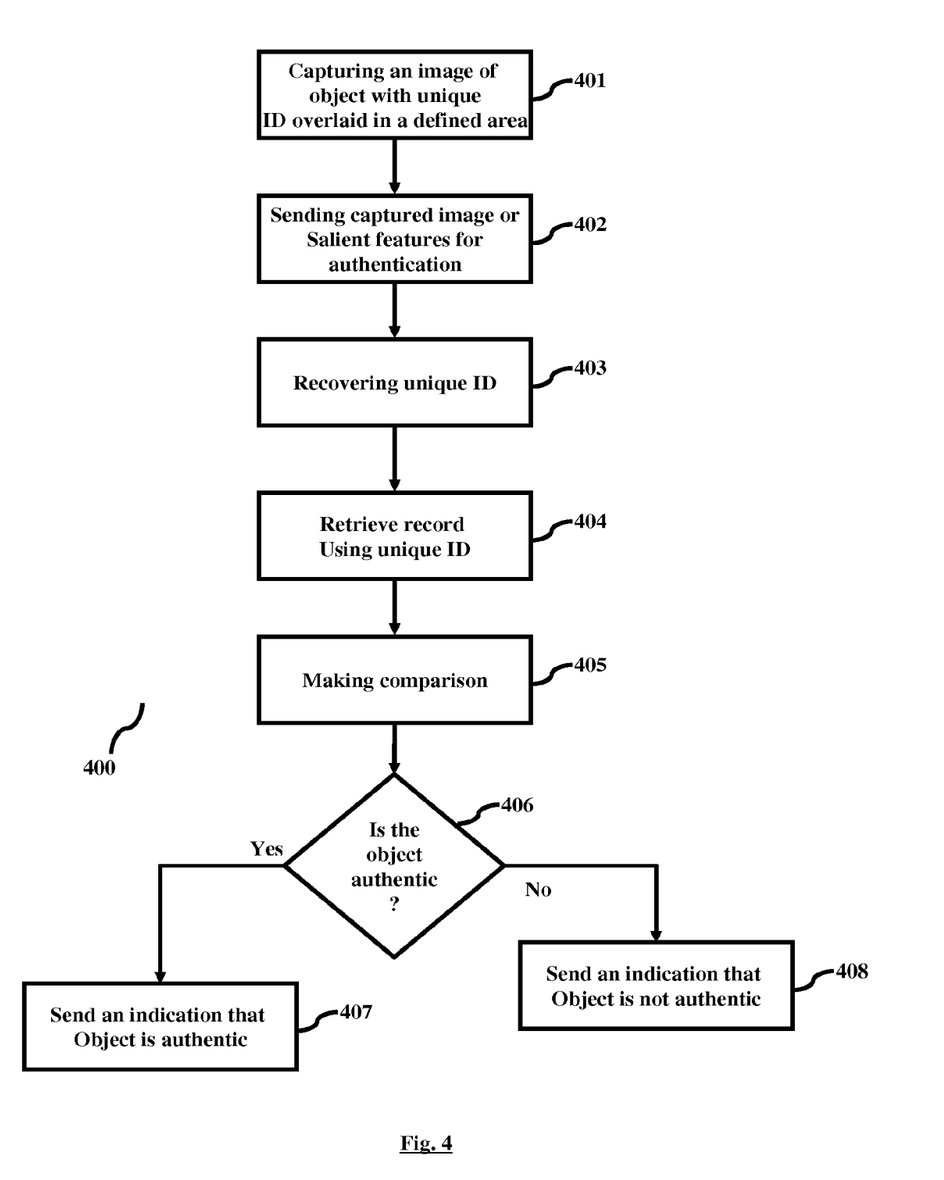
FIG. 4 illustrates a flow diagram which describes the process of authentication of the certified object at the consumer end, as disclosed in the embodiments herein.

FIG. 4 illustrates a flow diagram which describes the process of authentication of the certified object at the consumer end as disclosed in the embodiments herein. A second image also referred to as "the verification image" of the object within the specified region L is captured (401) using an image capturing and communication device. The unique ID affixed to the object is also captured. Further, the verification image and the unique ID of the object are sent (402) to the server 102. In an embodiment, the image capturing device could process the image to derive the salient features which could be sent to the server 102. Further, from the received verification image, the server computes (403) the salient features of the image, if necessary. Further, the server 102 retrieves (404) the original image data record from the database 103 using the unique ID. This record has the salient features of the original image and the location L of the original image from which these features were drawn. Further, authentication of the object is performed by comparing (405) the salient features extracted from the verification image with the salient features of the original image retrieved from the database. In another embodiment, the image capturing device may recover the unique ID first. The unique ID is then sent to the server 102 which retrieves the relevant data record from the database. Location information of specified region L is transmitted from the data record in a secured way to the image capturing device in order to prevent unauthorized access of the location information. The image capturing device then captures the image of the specified region L. This image is transmitted to the server. The server extracts the salient features of the natural pattern of the verified image. The server compares these with the salient features of the original image retrieved from the database to perform the authentication. If the salient features of the original image and the verification image match, then authentication is deemed succeeded, else authentication is deemed failed. The authentication result is transmitted (406) to the consumer end to conclude the authentication.

If a positive match is found, authenticity of that particular object is confirmed. If a positive match is not found during comparison, the object is considered as a counterfeit object.

The various actions in method 400 may be performed in the order presented, in a different order or simultaneously. Further, in some embodiments, some actions listed in FIG. 4 may be omitted.

Figure 5:
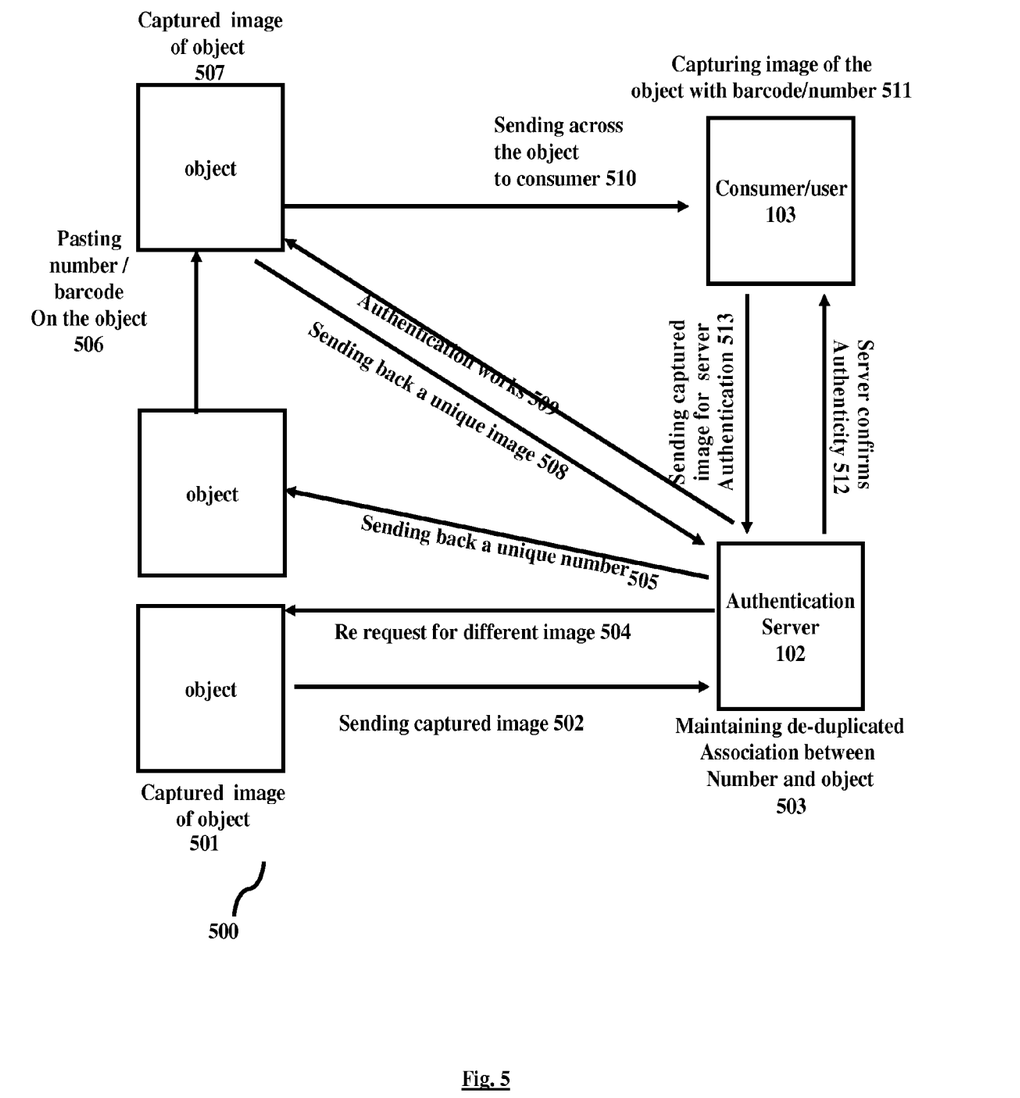
FIG. 5 illustrates a flow diagram which describes the process of authentication of the certified object at the consumer end with the matching of salient features happening in the network, as disclosed in the embodiments herein.

FIG. 5 illustrates a flow diagram which describes the total process of locating an area of the object that has unique salient features, assigning a unique ID to the salient features, trial authentication of an object at the producer end and authentication of the certified object at the consumer end, as disclosed in the embodiments herein. This figure depicts the combination of the FIGS. 2, 3 and 4. Process step 501 corresponds to 201. Process step 502 corresponds to 202. Process step 504 corresponds to the looping back between 203 and 201. Process step 204 is a computation step in 102. Process step 503 corresponds to 205. Process step 505 corresponds to 206. Process step 506 corresponds to 207. Process step 507 corresponds to 301. Process step 508 corresponds to 302. Process steps 303, 304 and 305 are computations steps in 104. Process step 509 corresponds to 306. The certified object is shipped to the consumer in 510. Process step 511 corresponds to 401.

Process step 512 corresponds to 402. Process steps 403, 404 and 405 are computation steps in 102. Process step 513 corresponds to 406.

In another embodiment, the date time stamp and/or the geographical co-ordinate information present in the database record are sent to the consumer only after a positive match is found, in step 513. This is done to insure that the object is authentic and the consumer can check authenticity of the object with the information printed on the product package.

In another embodiment, other attributes such as manufacturing date, batch number, item number, weight, size, product category and so on which help provide assurance of the product authenticity are available in the data record. Such attributes are sent to the consumer only after a positive match is found, in step 513. The consumer can further improve his/her confidence by comparing the attributes with what is printed on the product package.

In another embodiment, for the purpose of quick verification, the original image retrieved from the database 103 using the unique ID key is sent to the consumer, in step 513, so that the user can inspect the sample image with reference to the original image and confirm the authenticity visually.

In another embodiment, the consumer can send a confirmation (514) that he/she is satisfied with the authenticity of the object. Once the system receives confirmation from the user, the data item is deleted from the records of database 103; the unique ID for sample image of certified object and original image of object are released. In another embodiment, the released original image unique ID can be reused with another object to be certified by capturing same pattern on that object and recording in the database. The various actions in method 500 may be performed in the order presented, in a different order or simultaneously. Further, in some embodiments, some actions listed in FIG. 5 may be omitted.

Figure 6:
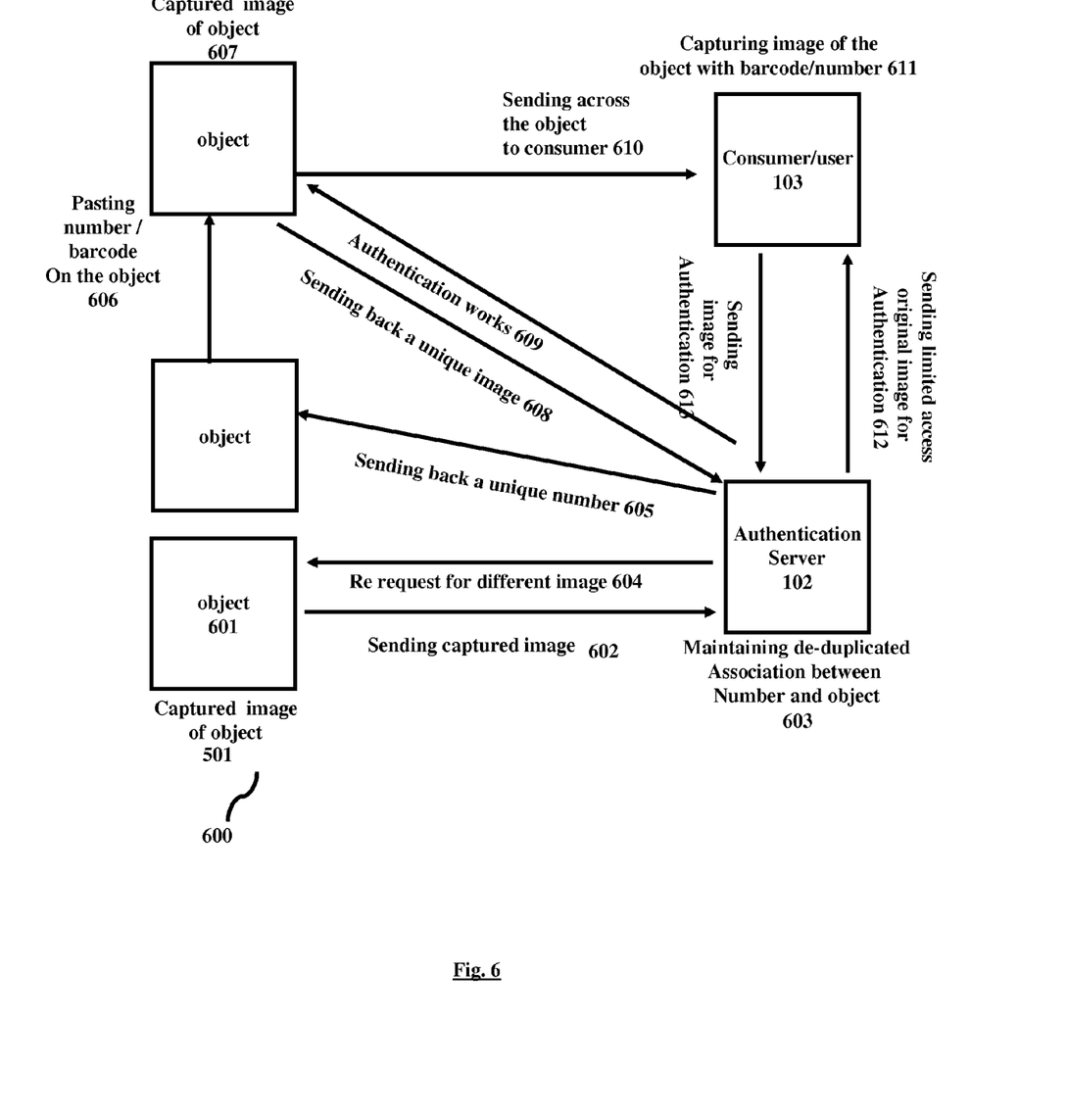
FIG. 6 illustrates a flow diagram which describes the process of assigning unique ID to an object and authentication of the certified object at user the consumer end with the matching of salient features also happening at the consumer end, as disclosed in the embodiments herein.

FIG. 6 illustrates a flow diagram which describes the total process of locating an area of the object that has unique salient features, assigning a unique ID to the salient features, trial authentication of an object at the producer end and authentication of the certified object at the consumer end with the matching of salient features also happening at the consumer end, as disclosed in the embodiments herein. This figure depicts the combination of the FIGS. 2, 3 and a few steps of 4. Process step 601 corresponds to 201. Process step 602 corresponds to 202. Process step 604 corresponds to the looping back between 203 and 201. Process step 204 is a computation step in 102. Process step 603 corresponds to 205. Process step 605 corresponds to 206. Process step 606 corresponds to 207. Process step 607 corresponds to 301. Process step 608 corresponds to 302. Process steps 303, 304 and 305 are computations steps in 104. Process step 609 corresponds to 306. The certified object is shipped to the consumer in 610. Process step 611 corresponds to 401. Process step 612 involves sending the unique ID captured in 611 to server 102. Server 102 retrieves the original image and other data corresponding to the unique ID and transmits it to the consumer end in 613. The consumer end image capturing device computes the salient features of the image captured in 611 and the original image. The two sets of the salient features are compared in the image capturing device at the consumer end.

In another embodiment, the date time stamp and/or geographical co-ordinate information present in the database record sent in 612. This is matched additionally to insure that the object is authentic and the consumer can check authenticity of the object with the information printed on the product package.

In another embodiment, other attributes such as manufacturing date, batch number, item number, weight, size, product category and so on which help provide assurance of the product authenticity are available in the data record. Such attributes are sent to the consumer in step 612. The consumer can further improve his/her confidence by comparing the attributes with what is printed on the product package.

In another embodiment, for the purpose of quick verification, the original image received in 612 could be matched with the object through visual inspection to confirm the authenticity.

In another embodiment, the consumer can send a confirmation (614) that he/she is satisfied with the authenticity of the object. Once the system receives confirmation from the user, the data item is deleted from the records of database 103; the unique ID for sample image of certified object and original image of object are released. In another embodiment, the released original image unique ID can be reused with another object to be certified by capturing same pattern on that object and recording in the database. The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network communication functions to access the network elements. The network elements shown in FIG. 1 include blocks which can be at least one of a hardware device, or a combination of hardware device and software module.

The embodiment disclosed herein specifies a system for authentication of objects. The mechanism allows differentiation between an original object and a counterfeit object providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the application may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

I claim:

1. A method for authenticating an object, wherein a unique pattern is present on surface of said object, said method comprising;
   extracting a unique ID from an image of said object, wherein said unique ID is present on surface of said object;
   retrieving an image corresponding to said unique ID from a database;
   comparing salient features of image of said object with salient features of said retrieved image;
   flagging said object as an authentic object, if salient features of image of said object matches with salient features of said retrieved image: and
   flagging said object as counterfeit object, if salient features of image of said object does not match with salient features of said retrieved image, wherein said object is first enrolled into a database for later verification, said enrolling further comprising:
   capturing an image of said object;
   processing said image for uniqueness of salient features;
   repeatedly investigating Other portions of surface of said object till uniqueness is achieved;
   creating a unique ID from said unique salient features; and
   creating a record in a database, wherein said record comprises of at least one of said unique salient features, said unique ID and ancillary information, wherein a method of looking for said unique salient features further comprises of
   checking if said unique pattern in said image is unique by comparing said unique pattern with a plurality of stored available patterns; and
   accepting said pattern of said object as a unique salient feature, if said pattern is not found within said plurality of stored available patterns.

2. The method as claimed in claim 1, wherein said unique ID is represented by a code which is at least one of:
   a bar code;
   a matrix code; or
   a Quick Response code.

3. The method as claimed in claim 1, wherein said ancillary information comprises of at least one of:
   at least one attribute of said object;
   at least one geographical co-ordinate at which said retrieved image was captured;
   at least one time stamp at which said image was captured; and
   said retrieved image.

4. A system for authenticating an object, wherein a unique pattern is present on surface of said object, said system comprising of a server configured for
   extracting a unique ID from an image of said object, wherein said unique ID is present on surface of said object;
   retrieving an image corresponding to said unique ID;
   comparing salient features of image of said object with salient features of said retrieved image;
   flagging said object as an authentic object, if salient features of image of said object matches with salient features of said retrieved image; and
   flagging said object as a counterfeit object, if salient features of image of said object does not match with salient features of said retrieved image, wherein said system is further configured for enrolling said object into a database for later verification by
   capturing an image of said object;
   processing said image for uniqueness of salient features;
   repeatedly investigating other portions of surface of said object till uniqueness is achieved;
   creating a unique ID from said unique salient features; and
   creating a record in a database, wherein said record comprises of at least one of said unique salient features, said unique ID and ancillary information, wherein said system is configured for looking for said unique salient features by
   checking if said unique pattern in said image is unique by comparing said unique pattern with a plurality of stored available patterns; and
   accepting said pattern of said object as a unique salient feature, if said pattern is not found within said plurality of stored available patterns.

5. The system as claimed in claim 4, wherein said system further comprises of said server configured for adding said pattern to said plurality of available patterns, on flagging said object as an authentic object.

6. A device for authenticating an object, wherein a unique pattern is present on surface of said object, said device comprising a processor configured for;
   extracting a unique ID from an image of said object, wherein said unique ID is present on surface of said object;
   retrieving an image corresponding to said unique ID;
   comparing salient features of image of said object with salient features of said retrieved image;
   flagging said object as an authentic object, if salient features of image of said object matches with salient features of said retrieved image; and
   flagging said object as a counterfeit object, if salient features of image of said object does not match with salient features of said retrieved image, wherein said device is further configured for enrolling said object into a database for later verification by
   capturing an image of said object;
   processing said image for uniqueness of salient features;
   repeatedly investigating other portions of surface of said object till uniqueness is achieved;
   creating a unique ID from said unique salient features; and
   creating a record in a database, wherein said record comprises of at least one of said unique salient features, said unique ID and ancillary information, wherein said device is configured for looking for said unique salient features by
   checking if said unique pattern in said image is unique by comparing said unique pattern with a plurality of stored available patterns; and
   accepting said pattern of said object as a unique salient feature, if said pattern is not found within said plurality of stored available patterns.

7. The device, as claimed in claim 6, wherein said device comprises said processor configured for fetching said retrieved image from a remote location.

8. The device, as claimed in claim 6, wherein said device comprises said processor configured for adding said unique pattern to said plurality of available patterns, on flagging said object as an authentic object.

* * * * *